United States Patent
Yudenfriend et al.

(10) Patent No.: US 7,502,908 B2
(45) Date of Patent: Mar. 10, 2009

(54) METHOD FOR PROVIDING AN ADDRESS FORMAT COMPATIBLE WITH DIFFERENT ADDRESSING FORMATS USED FOR ADDRESSING DIFFERENT SIZED ADDRESS SPACES

(75) Inventors: Harry Morris Yudenfriend, Poughkeepsie, NY (US); Richard Anthony Ripberger, Tucson, AZ (US); Kenneth Michael Kapulka, St. Petersburg, FL (US); Josephine M. Edwards, legal representative, St. Petersburg, FL (US); Peter Grimm Sutton, La Grangeville, NY (US); Matthew Joseph Kalos, Tucson, AZ (US); Wayne Erwin Rhoten, Morgan Hill, CA (US); Marc Kenneth Duquette, Santa Cruz, CA (US); Michelle Dais, legal representative, Santa Cruz, CA (US); James B. Cammarata, La Grange Park, IL (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 11/381,712

(22) Filed: May 4, 2006

(65) Prior Publication Data
US 2007/0260825 A1    Nov. 8, 2007

(51) Int. Cl.
G06F 12/06    (2006.01)
(52) U.S. Cl. ...................................... 711/212
(58) Field of Classification Search ................. 711/200, 711/212
See application file for complete search history.

(56) References Cited

U.S. PATENT DOCUMENTS

| | | | | |
|---|---|---|---|---|
| 5,140,684 | A | * | 8/1992 | Sakamura et al. ........... 711/163 |
| 5,450,587 | A | | 9/1995 | Salm |
| 5,661,848 | A | * | 8/1997 | Bonke et al. ................ 711/112 |
| 5,784,710 | A | | 7/1998 | Kaiser et al. |
| 6,034,831 | A | * | 3/2000 | Dobbek et al. ................ 360/53 |
| 6,128,718 | A | | 10/2000 | Schmisseur et al. |
| 6,889,307 | B1 | | 5/2005 | Scheuerlein |
| 2004/0015672 | A1 | | 1/2004 | Masse |
| 2005/0172064 | A1 | | 8/2005 | Krygier |
| 2007/0055819 | A1 | * | 3/2007 | So et al. ..................... 711/112 |

OTHER PUBLICATIONS

PCT International Search Report & Written Opinion dated Aug. 2, 2007 for application No. PCT/EP2007/053690 filed Apr. 16, 2007.

(Continued)

*Primary Examiner*—Kevin L Ellis
(74) *Attorney, Agent, or Firm*—David Victor; Konrad Raynes & Victor LLP

(57) ABSTRACT

Provided is a method, system, and article of manufacture for providing an address format compatible with different addressing formats used for addressing different sized address spaces. An address format is used in an operating system to address storage space in a storage device comprising a first region and a second region of storage space. A first group of applications uses the address format to only address the storage space in the first region and is not coded to use the address format to access the second region and a second group of applications uses the address format to address the storage space in the first and second regions.

12 Claims, 5 Drawing Sheets

OTHER PUBLICATIONS

J. McKown, "Capacity of Largest Drive" [online] Jul. 19, 2005 [retrieved on Jul. 18, 2007] Document No. XP002443185, http://groups.google.com/group/bit.listserv.ibm-main/msg/371f77504273db43.

R. Skorupka, "Capacity of Largest Drive", [online] Jul. 20, 2007 [retrieved on Jul. 18, 2005] Document No. XP002443186, http://groups.google.com/group/bit.listserv.ibm-main/msg/a0dc7cla24a3b017?dmode=print.

* cited by examiner

METHOD FOR PROVIDING AN ADDRESS FORMAT COMPATIBLE WITH DIFFERENT ADDRESSING FORMATS USED FOR ADDRESSING DIFFERENT SIZED ADDRESS SPACES

BACKGROUND OF THE INVENTION

1. Field of the Invention

The present invention relates to a method, system, and program for providing an address format compatible with different addressing formats used for addressing different sized address spaces.

2. Description of the Related Art

In certain computing environments, multiple host systems may communicate with multiple control units (CUs) (also known as storage controllers, storage subsystems, enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS is configured to include multiple volumes.

The host systems include operating systems, middleware (such as data bases) and applications that translate data requests from applications into an address that may be presented to the control unit. The control unit translates the received address into a physical location on a storage device from which to access the requested data. For instance, in certain environments, the host operating system presents an address having a cylinder number, track number, and record number in a specific format.

If larger storage volumes are added, the addressing format used by the operating system may have to be changed to add bytes to provide addressing for a larger storage space. If the addressing format is changed, then the data used by the current applications and operating system is migrated to the new storage system configured to use the larger addressing space and the applications must be migrated over to use the newer versions of the operating system that are coded to use the new address format providing access to the larger storage spaces. These migration operations can take a significant amount of time and be disruptive to the operating environment.

For these reasons, there is a need in the art for improved techniques for making larger storage spaces available to a current operating environment.

SUMMARY

Provided are a method, system, and article of manufacture for providing an address format compatible with different addressing formats used for addressing different sized address spaces. An address format is used in an operating system to address storage space in a storage device comprising a first region and a second region of storage space. A first group of applications uses the address format to only address the storage space in the first region and is not coded to use the address format to access the second region and a second group of applications uses the address format to address the storage space in the first and second regions.

In a further embodiment, the first region is accessed with a first range of addresses defined in the address format and the second region is accessed with a second range of addresses higher than the first range of addresses defined in the address format.

In a further embodiment, the address format includes a first and second sets of bits, wherein the first group of applications changes the first set of bits and does not change the second set of bits to form addresses and wherein the second group of applications changes both the first and second sets of bits to form addresses.

In a further embodiment, for the second group of applications, the first set of bits comprises least significant bits for the address and the second set of bits comprises most significant bits for the address.

In a further embodiment, a third set of bits in the address format are modified by the first and second groups of applications to form addresses to address the first and second regions, respectively.

In a further embodiment, the first group of applications processes the first set of bits as a first number of the address and the second and third sets of bits as a second number of the address and wherein the second group of applications processes the first set of bits as the least significant bits of the first number and the second set of bits as the most significant bits of the first number and the third set of bits as the second number.

In a further embodiment, the first number comprises a cylinder number and the second number comprises a track number.

In a further embodiment, the first group of applications only changes the third set of bits and not the second set of bits when setting the second number in the address.

In a further embodiment, the first set of bits comprises four bytes, the second set of bits comprises three bytes, and the third set of bits comprises one byte.

In a further embodiment, the first group of applications comprises heritage applications that only uses heritage storage devices having the first region of addresses and the second group of applications comprises current generation applications that access storage devices having the first and second regions of addresses.

In a further embodiment, the address format allows an expansion of the storage space through providing the second region of storage space to allow growth from smaller volumes to larger volumes without affecting the addresses that already exist in the first storage region. The first group of applications may continue to run uninterrupted while volumes are dynamically expanded into the second region using the address format.

Further provided is an operating system that processes requests by a first group of applications and a second group of applications for data at addresses in a storage space in a storage device comprising a first region and a second region of storage space. The addresses are in an address format. The first group of applications uses the address format to only address the storage space in the first region and is not coded to use the address format to access the second region and the second group of applications uses the address format to address the storage space in the first and second regions. A storage manager managing access to the storage space processes the requests from the first and second groups of applications to access the requested data at the addresses in the storage space indicated in the address format.

In a further embodiment, the address format includes a first and second set of bits, wherein the address has a first number and a second number. The first group of applications only modifies the first set of bits for the first number and the second group of applications uses both the first and the second sets of bits for the first number. The storage manager further performs: generating a command response to report information on the first number of one address in the storage space; including the first set of bits in a part of the command response intended for the first number of the address; determining whether the first number of the address to report requires use of the second set of bits of the address; and including the second set of bits in a portion of the generated command response not used by the first group of applications to determine the first number of the address in response to determining that the first number requires use of the first and second sets of bits.

DETAILED DESCRIPTION

In the following description, reference is made to the accompanying drawings which form a part hereof and which illustrate the embodiments of the present invention. It is understood that other embodiments may be utilized and structural and operational changes may be made without departing from the scope of the present invention.

Figure 1:
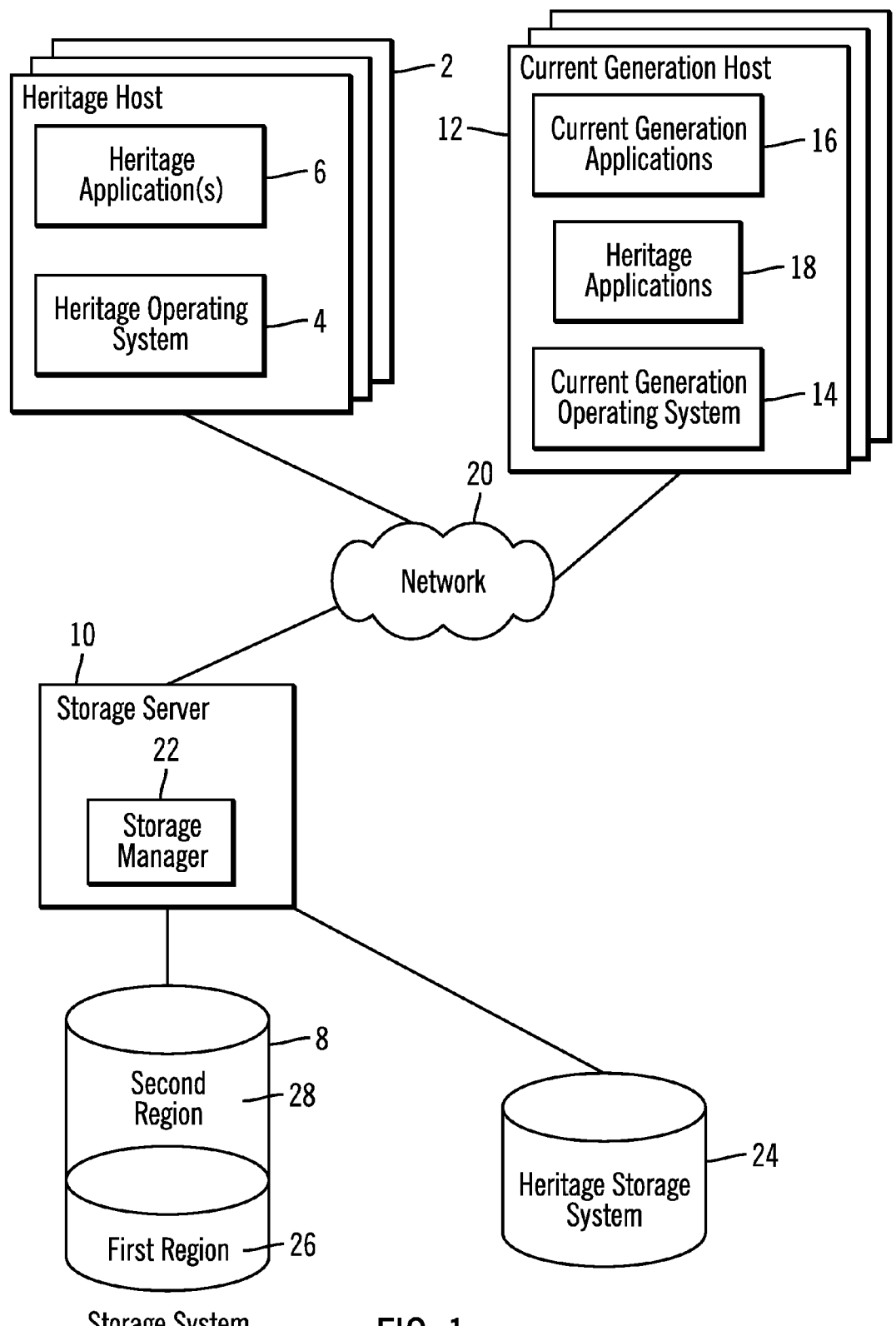
FIG. 1 illustrates an embodiment of a computing environment.

FIG. 1 illustrates a computing environment in which aspects of the invention are implemented. One or more heritage hosts 2 include a heritage operating system 4 and heritage applications 6 that access data in a storage system 8 managed by a storage server 10. One or more current generation hosts 12 include a current generation operating system 14 intended to replace the heritage operating system 4 and both current generation 16 and heritage applications 18. The applications 16, 18 submit data requests to the storage server 10 and access data in the storage system 8 through the storage server 10. The hosts 2, 12 and storage server 10 may communicate over a network 20. The storage server 10 includes a storage manager 22 that manages I/O requests from the host operating systems 4, 14 for data in the storage system 8. The heritage 4 and current generation 14 operating systems are further capable of accessing a heritage storage system 24 through the storage server 10.

The storage system 8 includes a range of addresses that address storage locations in a first region 26 of the storage 8 and a range of higher addresses, above the addresses of the first region 26, that address storage locations in a second region 28. In one embodiment, the heritage storage system 24 includes less storage space than the storage system 8 and includes the same number of addressable locations as the first storage region 18. The storage manager 22 translates the address provided from the host operating systems 4, 14 into a physical location in the storage 8.

The hosts 2, 12 may comprise computational devices known in the art, such as a workstation, mainframe, server, etc. The storage server 10 may comprise a storage subsystem or server, such as an enterprise storage server, storage controller, etc., or other device used to manage I/O requests to attached volumes. The storage systems 8, 24 may comprise storage devices known in the art, such as interconnected hard disk drives (e.g., configured as a DASD, RAID, JBOD, virtualized devices, etc.), magnetic tape, electronic memory, flash memory, optical disk, etc. The network 20 may comprise a Local Area Network (LAN), Storage Area Network (SAN), Wide Area Network (WAN), peer-to-peer network, wireless network, etc. Alternatively, the hosts 2, 12 may communicate with the storage server 10 over a bus interface, such as a Peripheral Component Interconnect (PCI) bus or serial interface.

The operating systems 4, 14 receive data requests from the applications 6, 16 for data and translate the request into an address recognized by the storage manager 22. The applications 6, 16 may include middleware, access methods, and independent software vendor (ISV) products. In one embodiment, the operating systems 4, 14 may communicate Input/Output (I/O) requests to the storage server 10 through a channel subsystem in the host 2, 12 that provides a plurality of logical paths to the storage server 10. The operating systems 4, 14 may manage path related operations. Each host 2, 12 may comprise a central processing unit (CPU) executing programs, including the operating systems 4, 14 and channel subsystem code (not shown). Alternatively, each host 2, 12 may comprise one of multiple logical partitions (LPARs) that each operate as independent systems, executing their own operating system 4, 14. In further embodiments, each processing system may comprise a logical partition of a processor. In this way, one or more processors in the hosts 2, 12 may implement multiple logical partitions (LPARs).

In one embodiment, the heritage operating system 4 and heritage applications 6, 18 may only access addresses in the first region 26 of the storage system 8 or any part of the heritage storage system 24. The current generation operating system 14 may utilize the same address format used by the heritage operating system 4 to access addresses in both the first 16 and second 18 regions of the storage system 8 as well as in the heritage storage system 24. The second region 10 provides a higher range of address than the first region 26. Further, the heritage storage system 24 does not include the address ranges of the second region 28. Thus, the heritage applications 6 and 18 comprise a first group of applications and the current generation applications 16 comprises a second group of applications that use the same address format.

Figure 2:
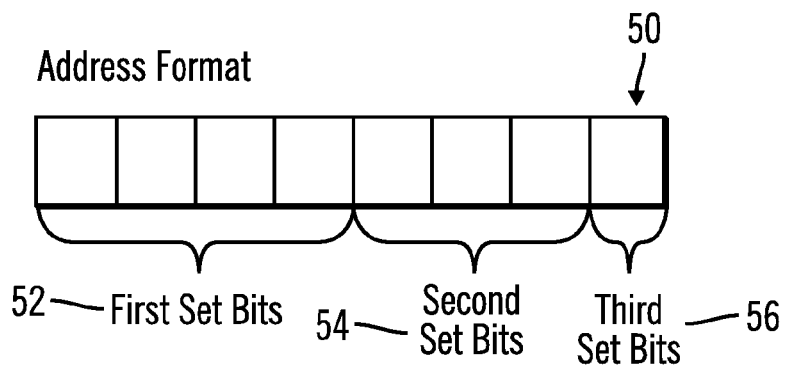
FIGS. 2 and 4 illustrate embodiments of an address format.

FIG. 2 illustrates an embodiment of an address format 50 used by both the heritage 4 and current generation 14 operating systems to communicate address requests to the storage manager 22. The address format 50 includes a first set of bits 52, a second set of bits 54, and a third set of bits 56. Each set of bits includes one or more bytes (where each byte is represented by one of the blocks. In the example of FIG. 2, the first set of bits 52 comprises four bytes, the second set 54 three bytes, and the third set 56 one byte. In alternative embodiments, each set 52, 54, and 56 may include any number of bytes.

In one embodiment, the heritage operating system 4 and heritage applications 6 and 18 use and modify only the first 52 and third 56 sets of bits to form addresses only capable of addressing the first region 26 in the storage 8, leaving the second set of bits 54 unchanged. The current generation operating system 14 and current generation applications 16 use and modifies the first 52, second 54, and third 56 sets of bits to form addresses capable of addressing both the first 26 and second 28 regions of the storage system 8.

Figure 3:
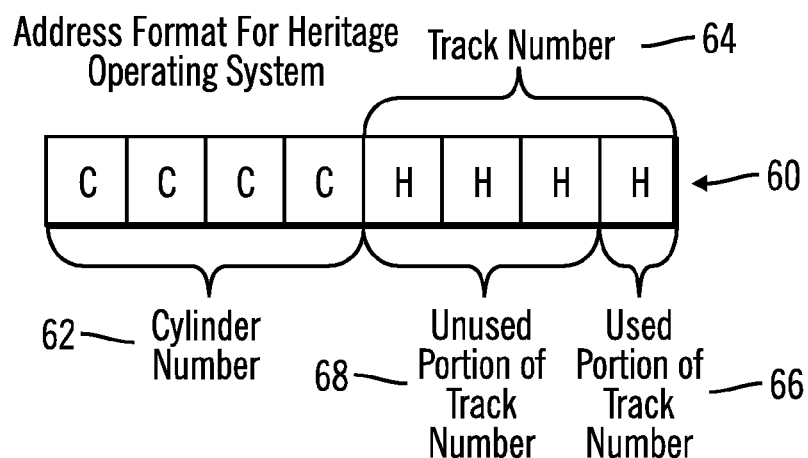
FIG. 3 illustrates an embodiment of a prior art address format.

FIG. 3 illustrates a prior art address format showing how the heritage operating system 4 and heritage applications interpret the fields in the address format 60, having bytes 62 used to form a cylinder number or first number portion of the address and bytes 64 used to form a track or second number of the address. The cylinder number 62 comprises a "CCCC" value, where each "C" may comprise a four bit nibble, such that "CCCC" is four nibbles or 16 bits or two bytes. Track number 64 comprises a "HHHH" value, where each "H" is a four bit nibble, such that "HHHH" is four nibbles or 16 bits or two bytes. However, the heritage operating system 4 only uses and modifies the last byte 66 to form the track number of the address and does not use or modify the bytes 68.

Figure 4:
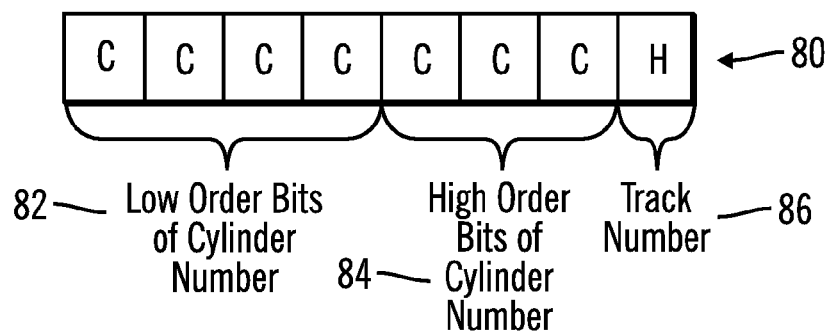

FIG. 4 illustrates an embodiment of how the current generation operating system 14 and current generation applications 16 view the address format 50 as address format 80, having bytes "CCCC" 82 used to form the low order bits of a cylinder number or first number portion of the address and the "ccc" 84 value forms the most significant bits of the cylinder number. Each "c" may comprise a four bit nibble, so "ccc" is three nibbles or 12 bits. The track number comprises nibble (or bits) 86.

As seen by FIGS. 2, 3, and 4, both the heritage 4 and current generation 14 operating systems use the same address format but use different sets of bits to form the first (cylinder) and second (track) numbers of the address. The heritage operating system 4 uses 16 bits (two bytes (four nibbles or 16 bits) "CCCC") for the cylinder number, whereas the current generation operating system 14 uses 28 bits (seven nibbles (or 28 bits) "CCCCccc") for the cylinder number. These expanded addresss formats that the current generation operating system 14 and applications 16 may form with the additional "ccc" bits allows the current generation operating system 14 to access and address the second storage region 18.

Further, the heritage operating system 4 and heritage applications 6, 18 (or middleware, applications and ISV software) do not use a portion of the address bytes and, thus, are limited to a lower range of addresses in the first region 26, whereas the current generation operating system 14 may use and modify all address bytes to form addresses to access locations in both the first 26 and second 20 storage regions.

With the described addressing system, the heritage applications 6 and heritage operating system 4 (or middleware, applications and ISV software) do not have to be changed to operate in network environments including hosts 12 running with the current generation operating system 14 and applications 16 because both share the same address format, but use different bits of the address format to form addresses. In this way, newer applications 16 may access all regions 18 and 20 of larger volumes and the heritage applications 6 and 18 running in both the heritage hosts 2 and current generation hosts 12 are limited to an address range for which they are programmed.

Further, the heritage operating system 4 and heritage applications 6 and 18 may continue to access heritage storage systems 24 without changing their addressing format, and the current generation operating system 14 and applications 16 may also access the heritage storage systems 24 using the same address format, but without specifying high order bits 82 (FIG. 3) which are not needed to address the lesser storage capacity of the heritage storage systems 24. Thus, with the described address format embodiments, the heritage operating system 14 and heritage applications 6 and 18 do not need to have their program instructions changed or updated to accommodate the address format required to access the larger address storage space.

Figure 5:
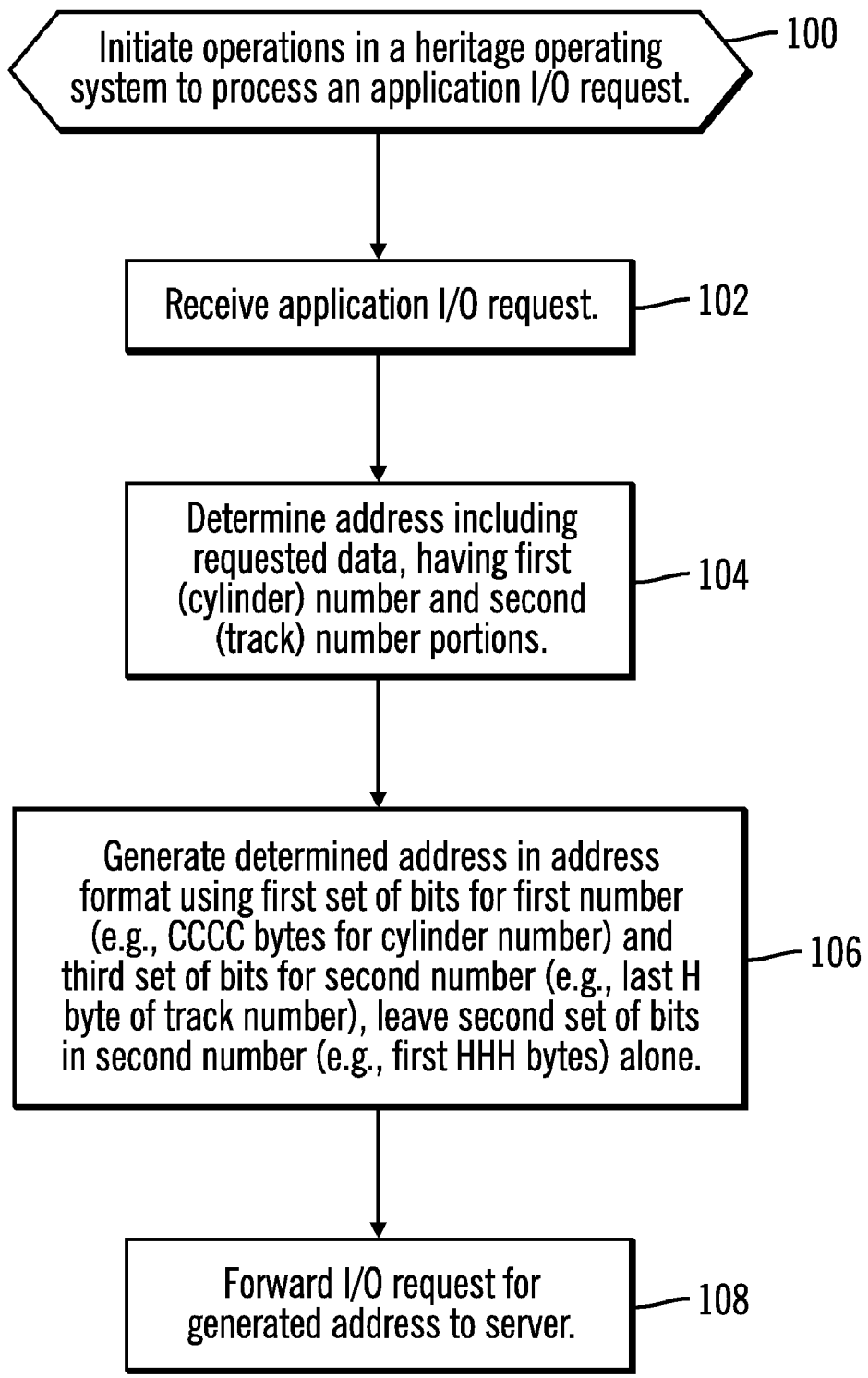
FIG. 5 illustrates an embodiment of operations known in the prior art performed by an operating system to generate an address to use with a data request.

FIG. 5 illustrates an embodiment of operations performed by the heritage operating system 4 to utilize the common address format. Upon initiating (at block 100) operations to process a heritage application 6 I/O request, the heritage operating system 4 receives (at block 102) an application I/O request. The heritage operating system 4 determines (at block 104) the address where the requested data is stored, where the address has a first portion 62 for a cylinder number 62 (FIG. 3) and second portion 64 for a track number 64. As discussed, in certain embodiments, the heritage operating system 4 only uses a portion 66 of the track number, and not portion 68 or the "HHH" bytes. In FIG. 3, the heritage operating system 4 uses only one nibble (4 bits) 66 for the track number, allowing for 16 different track numbers. In the heritage 3390 track geometry, there are only 15 tracks per cylinder. The heritage operating system 4 generates (at block 106) the determined address in the address format 60 (FIG. 3) using first set of bits 62 for a first number (e.g., "CCCC" bits for cylinder number) and third set of bits 66 for a second number (e.g., last H nibble (4 bits) of track number), leaving the second set of bits 68 in second number (e.g., first "HHH" bits (3 nibbles)) alone. The I/O request including the generated address is sent (at block 108) to the storage server 10 to process.

Figure 6:
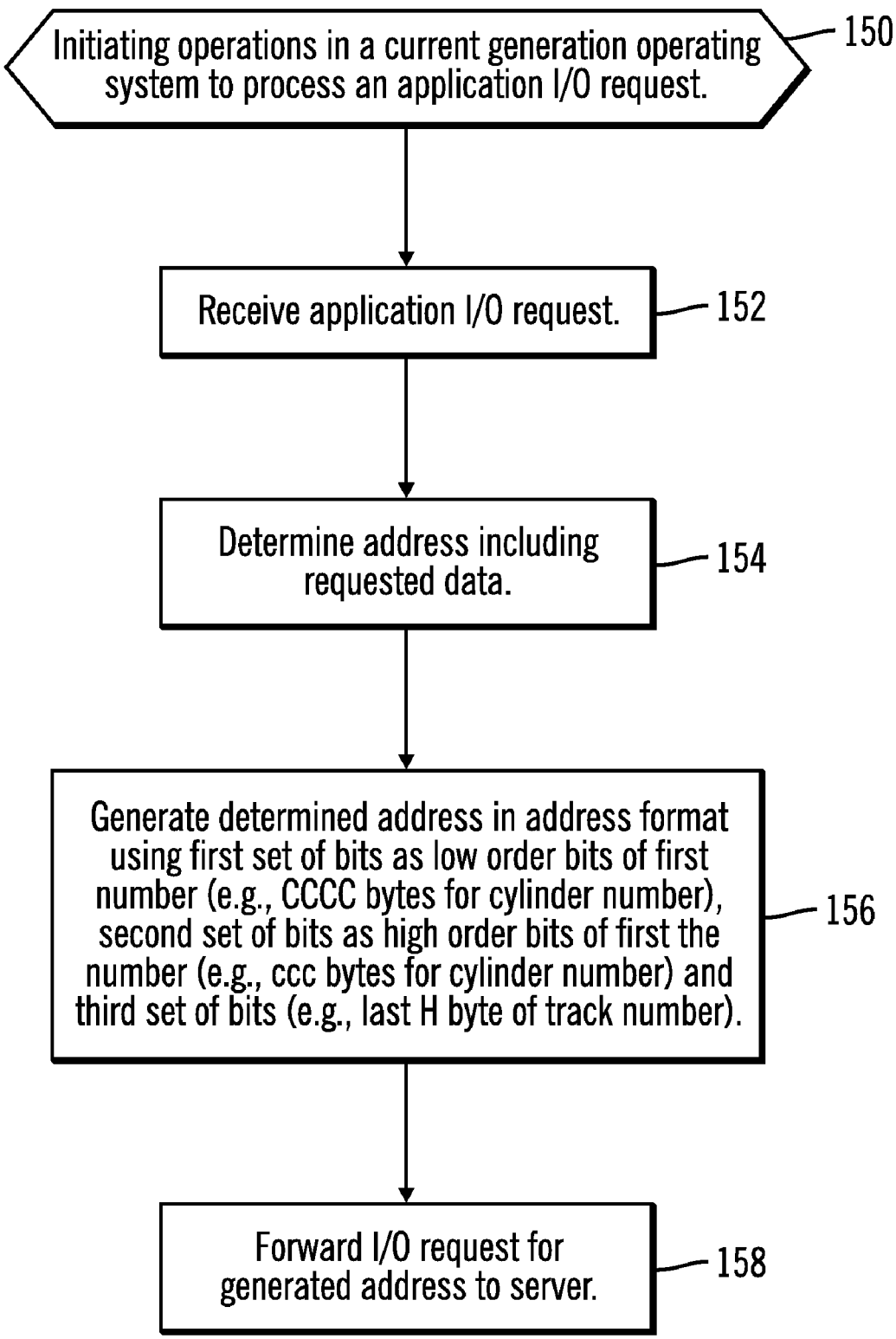
FIG. 6 illustrates an embodiment of operations performed by an operating system to generate an address to use with a data request.

FIG. 6 illustrates an embodiment of operations performed by the current generation operating system 14 to utilize the common address format 50 (FIG. 2) as address 80 (FIG. 4). Upon initiating (at block 150) operations to process an application I/O request, the heritage operating system 14 receives (at block 152) an application 16, 18 I/O request. The current generation operating system 14 determines (at block 154) the address including the requested data, which has a first (cylinder) number 82 (low order bits) and 84 (high order bits) (FIG. 4) and second (track) number 86 portions. As discussed, in certain embodiments, the current generation operating system 14 uses the unused portion of the track number 68 (FIG. 3) for the heritage operating system 4 as the high order bits of the cylinder number 82 and only has one nibble (4 bits) track number 84. The current generation operating system 14 generates (at block 156) the determined address in the address format 80 using a first set of bits 82 as low order bits of the first (cylinder) number (e.g., "CCCC" bits (4 nibbles) for cylinder number), a second set of bits 84 as the high order bits of the first (cylinder) number (e.g., "ccc" bits (3 nibbles) for cylinder number) and a third set of bits 86 as the second (track) number (e.g., last H nibble (4 bits) of track number). The current generation operating system 14 then forwards (at block 158) the I/O request for the generated address to server.

With the described embodiments, operating systems, such as heritage operating system 4 and applications 6 and 18 (or applications and middleware), that are not programmed to use the high order bits 82 for the cylinder number are restricted to using addresses for the first region 26 and cannot use addresses for accessing the second region 28.

Figure 7:
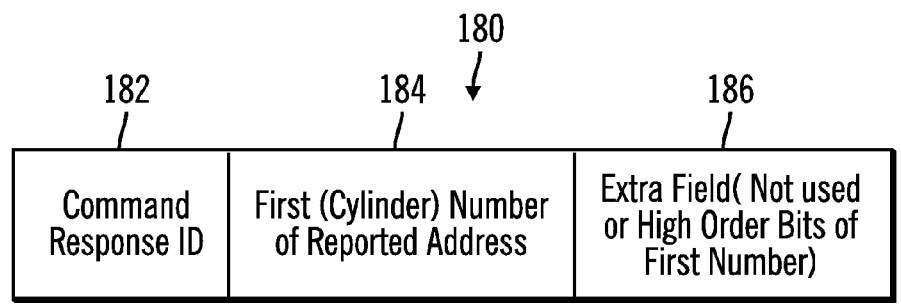
FIG. 7 illustrates an embodiment of a command response reporting address information.

FIG. 7 illustrates an embodiment of a command response format that the storage manager 22 in the storage server 10 uses to report address information to the heritage 4 and current generation 14 operating systems. The command response 180 includes a command identifier (ID) 182; a first (cylinder) number of the address being reported 184; and an extra field 186 that is not used if the command response 180 is being reported to the heritage operating system 4, which only uses a four byte cylinder number, or is used if the command response 180 is being reported to the current generation operating system 14, which uses the high order 82 or second set of bits 54. In this way, the command response 180 is not modified with respect heritage operating systems 4 that operate with only a two byte (4 nibble) "CCCC" cylinder number. However, an extra field 186 of the command response with respect to the heritage operating system 4 is used for the high 12 order bits of the cylinder number used by the current generation operating system 14 to report the cylinder number in the format for the current generation operating system 14. The current generation operating system 14 is coded to look at both fields 182 and 186 for the complete cylinder number value, whereas the heritage operating system 4 only looks at field 62 and not the unused portion 68 to determine the cylinder number of the address.

Figure 8:
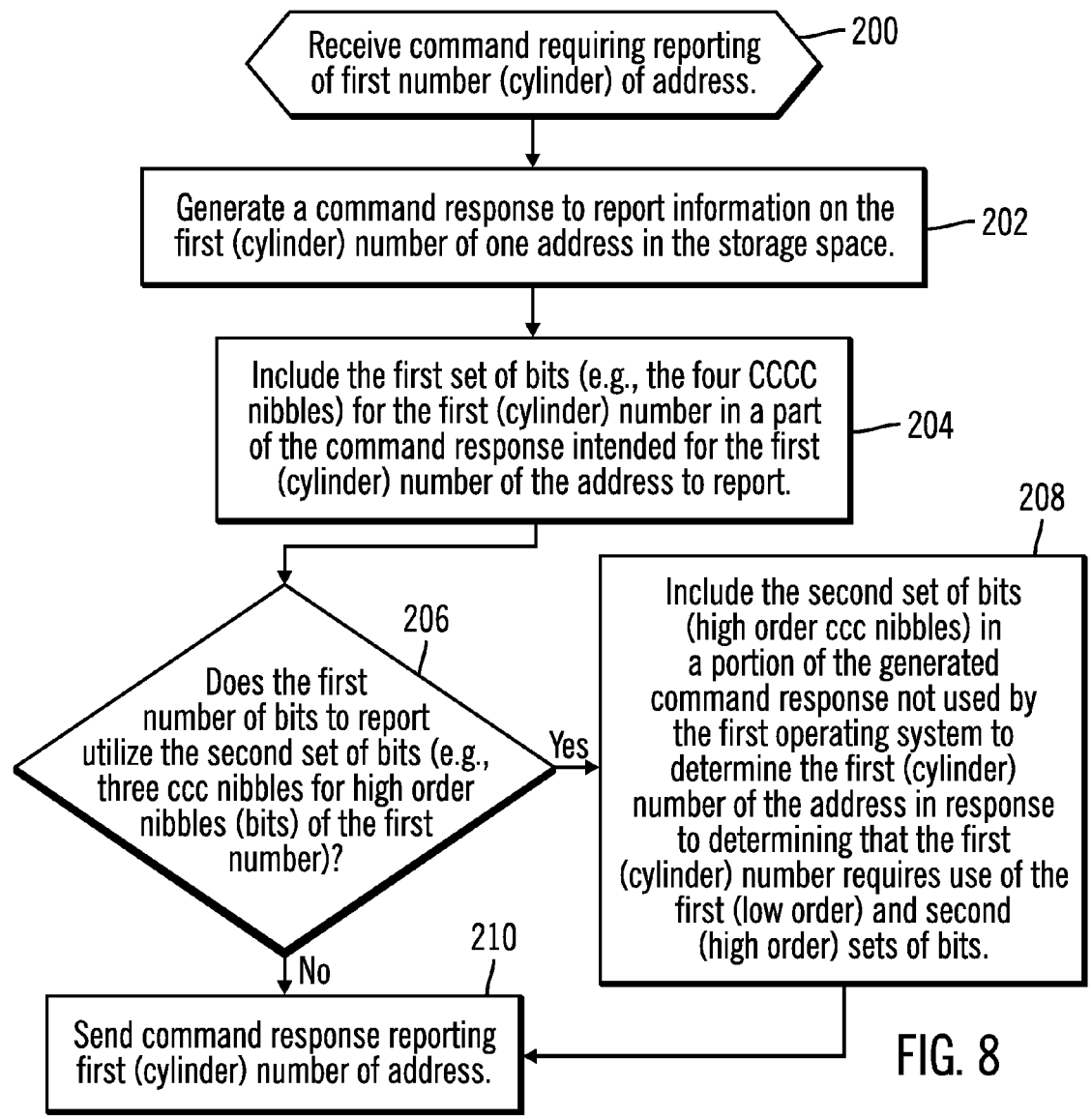
FIG. 8 illustrates an embodiment of operations to generate the command response reporting on an address.

FIG. 8 illustrates an embodiment of operations performed by the storage manager 22 to report address information in a command response to the heritage 4 and current generation 14 operating systems. Upon receiving (at block 200) a command requiring reporting of first number (cylinder) of an address, the storage manager 22 generates (at block 202) a command response 180 (FIG. 7) to report information on the first (cylinder) number of one address in the storage space. The storage manager 22 includes (at block 204) the first set of bits 52 (e.g., the four "CCCC" bits (4 nibbles) 62 (FIG. 3) or 80 (FIG. 4)) for the first (cylinder) number in a part 184 of the command intended for the first (cylinder) number of the address to report. The storage manager 22 determines (at block 206) whether the first (cylinder) number of the address to report utilizes the second set of bits (e.g., three "ccc" nibbles (12 bits) 82 for high order bits of the cylinder number). If the high order bits are needed, i.e., the address is intended for a current generation operating system 14 (or application or middleware), then the storage manager 22 includes (at block 208) the second set of bits 54 (high order "ccc" bits (3 nibbles) 82) in the section 186 of the generated command not used by the heritage operating system 4 to determine the first (cylinder) number of the address. After adding (at block 208) the second set of bits 54 (high order bits) or if the second set of high order bits are not needed, i.e., the address is intended for a heritage operating system 4, then the storage manager 22 sends (at block 210) the command response 180 reporting the first (cylinder) number of address in address field(s) 184 or 184 and 186.

The described disk address format may be used by storage control units, operating systems, middleware and applications to expand the data accessible on storage devices. The expanded addressability is upward compatible with the current generation operating systems and applications and downward compatible with the older heritage operating systems and applications. Additionally, the volume can be dynamically expanded in place without affecting existing data or its addresses on disk, and maintains compatibility with heritage system track geometry, which allows for compatibility with old programs that read/write data with respect to the heritage system track geometry.

In the described embodiments, the applications 6, 16, 18 use the address format to address data in the storage system 8 by submitting a data request to either operating system 4, 14. The operating systems 4, 14 forward the request to the storage manager 22. The storage manager 22 uses the address in the address format to access the requested data from the storage systems 8, 24.

With the described embodiments, both heritage 4 and current generation 14 operating systems may utilize and receive the same common address format to use to address storage space in storage systems 8 including expanded storage space, i.e., the second region 8, not recognized by the heritage operating system 4, and address storage space in heritage storage systems 24. In the described embodiments, the current generation operating system 14 use fields 68 in the address 60 (FIG. 3) that are unused by the heritage operating system 4 to include high order bits 82 to form addresses to storage regions 20 that are not recognized or available to the heritage operating system 4 configured to access a heritage storage system 24. At the same time, the heritage operating system 4 may continue to use the address format to address heritage storage systems 24 or the limited first region 26 of larger storage systems 8. In other words, both operating systems 4 and 14 use the same common address format structure 50, but view the fields in this address 50 differently, as shown in FIGS. 3 and 4.

Moreover, with the described embodiments, the administrator does not need to migrate heritage data in a heritage storage system 24 to a storage system 8 configured for use with an expanded address space 20 and then configure the heritage applications 6 to work with the current generation operating system 14. With the described embodiments, heritage applications 6 may continue to access the same storage space through a heritage operating system 4 using the same address format used by the current generation operating system 14.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium having code executed by a processor or hardware logic implementing the code as hardware logic. Of course, those skilled in the art will recognize that many modifications may be made to this configuration without departing from the scope of the present invention, and that the article of manufacture may comprise suitable information bearing medium known in the art.

The described embodiments discussed different formats for the fields of the address as shown in FIGS. 3 and 4. In additional embodiments, the address formats shown in FIGS. 2, 3, and 4 may include less or additional bytes or different information than shown.

In the described embodiments, the same address format was used by different types of operating systems mentioned as heritage versus current generation operating systems. Additionally, the address format may be used by operating systems from different vendors that have different addressing requirements, such as discussed with respect to the heritage 4 and current generation 14 operating systems. Further, the operating systems may be different versions from one vendor.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2, 3, 4, and 7 show addresses and a command response in a certain format. In alternative embodiments, the address and commands shown in these figures may be maintained in alternative data structures and formats, and include different fields than shown.

The illustrated operations of FIGS. 5, 6, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
processing an address format used in an operating system executed in a computer readable storage medium to address storage space in a storage device comprising a first region and a second region of storage space, wherein a first group of applications is coded to use a first set of bits in the address format and is limited to only address the storage space in the first region and is not coded to use bits in a second set of bits of the address format to access the second region and a second group of applications is coded to use the first and second sets of bits in the address format to address the storage space in the first and second regions.

2. The method of claim 1, wherein the first region is accessed with a first range of addresses defined in the address format and the second region is accessed with a second range of addresses higher than the first range of addresses defined in the address format.

3. The method of claim 1, wherein for the second group of applications, the first set of bits comprises least significant bits for the address and the second set of bits comprises most significant bits for the address.

4. The method of claim 1, wherein a third set of bits in the address format are modified by the first and second groups of applications to form addresses to address the first and second regions, respectively.

5. The method of claim 4, wherein the first group of applications processes the first set of bits as a first number of the address and the second and third sets of bits as a second number of the address and wherein the second group of applications processes the first set of bits as the least significant bits of the first number and the second set of bits as the most significant bits of the first number and the third set of bits as the second number.

6. The method of claim 5, wherein the first number comprises a cylinder number and the second number comprises a track number.

7. The method of claim 5, wherein the first group of applications only changes the third set of bits and not the second set of bits when setting the second number in the address.

8. The method of claim 7, wherein the first set of bits comprises four bytes, wherein the second set of bits comprises three bytes, and wherein the third set of bits comprises one byte.

9. The method of claim 1, wherein the first group of applications comprises heritage applications that only uses heritage storage devices having the first region of addresses and wherein the second group of applications comprises current generation applications that access storage devices having the first and second regions of addresses.

10. The method of claim 1, wherein the address format allows an expansion of the storage space through providing the second region of storage space to allow growth from smaller volumes to larger volumes without affecting the addresses that already exist in the first storage region, wherein the first group of applications may continue to run uninterrupted while volumes are dynamically expanded into the second region using the address format.

11. A method, comprising:

processing, by an operating system executed in a computer readable storage medium, requests by a first group of applications and a second group of applications for data at addresses in a storage space in a storage device comprising a first region and a second region of storage space, wherein the addresses are in an address format, wherein the first group of applications is coded to use a first set of bits in the address format and is limited to only address the storage space in the first region and is not coded to use bits in a second set of bits of the address format to access the second region and the second group of applications is coded to use the first and second sets of bits in the address format to address the storage space in the first and second regions; and processing, by a storage manager managing access to the storage space, the requests from the first and second groups of applications to access the requested data at the addresses in the storage space indicated in the address format.

12. The method of claim 11, wherein the address format includes a first and second set of bits, wherein the address has a first number and a second number, wherein the first group of applications only modifies the first set of bits for the first number and wherein the second group of applications uses both the first and the second sets of bits for the first number, wherein the storage manager further performs:

generating a command response to report information on the first number of one address in the storage space;

including the first set of bits in a part of the command response intended for the first number of the address;

determining whether the first number of the address to report requires use of the second set of bits of the address; and including the second set of bits in a portion of the generated command response not used by the first group of applications to determine the first number of the address in response to determining that the first number requires use of the first and second sets of bits.

* * * * *